(12) United States Patent
Picatto et al.

(10) Patent No.: US 9,133,882 B2
(45) Date of Patent: Sep. 15, 2015

(54) SEALING UNIT FOR ROLLING-ELEMENT BEARINGS

(75) Inventors: Fabio Picatto, Turin (IT); Alberto Visconti, Varese (IT)

(73) Assignee: AKTIEBOLAGET SKF, Gothenburg (SE)

( * ) Notice: Subject to any disclaimer, the term of this patent is extended or adjusted under 35 U.S.C. 154(b) by 582 days.

(21) Appl. No.: 13/316,661

(22) Filed: Dec. 12, 2011

(65) Prior Publication Data

US 2012/0161402 A1   Jun. 28, 2012

(51) Int. Cl.
*F16J 15/32*   (2006.01)
*F16C 33/78*   (2006.01)
*F16C 19/06*   (2006.01)

(52) U.S. Cl.
CPC ............. *F16C 33/7856* (2013.01); *F16C 19/06* (2013.01)

(58) Field of Classification Search
USPC ........... 277/551, 572, 411; 384/484, 486, 477
See application file for complete search history.

(56) References Cited

U.S. PATENT DOCUMENTS

| | | | | |
|---|---|---|---|---|
| 2,467,049 A * | 4/1949 | Peterson | ....................... | 277/375 |
| 2,766,082 A * | 10/1956 | Ritchey | .......................... | 384/484 |
| 2,914,365 A * | 11/1959 | Spicacci | ....................... | 384/482 |
| 2,962,308 A * | 11/1960 | Cobb | ............................. | 277/376 |
| 3,032,346 A * | 5/1962 | Sullivan | ......................... | 277/565 |
| 3,145,996 A * | 8/1964 | Ninos et al. | ................... | 277/551 |
| 3,226,168 A | 12/1965 | Recknagel | | |
| 3,700,296 A * | 10/1972 | Bugmann | ..................... | 384/484 |
| 3,752,544 A * | 8/1973 | Hay | ............................... | 384/484 |
| 3,806,212 A * | 4/1974 | Piva | .............................. | 384/484 |
| 3,854,734 A * | 12/1974 | West | ............................ | 277/565 |
| 3,869,181 A * | 3/1975 | Barber | ......................... | 384/482 |
| 4,110,883 A * | 9/1978 | McAllister et al. | ......... | 29/898.11 |
| 4,304,412 A * | 12/1981 | Ladin | ............................ | 277/353 |
| 4,526,485 A * | 7/1985 | Frase et al. | .................... | 384/486 |
| 4,533,265 A * | 8/1985 | Woodbridge | ................. | 384/477 |
| 4,544,168 A * | 10/1985 | Hans et al. | .................... | 277/353 |
| 4,928,371 A * | 5/1990 | Colanzi et al. | ........... | 29/898.064 |
| 5,110,222 A * | 5/1992 | Johnson et al. | ............... | 384/482 |
| 5,163,691 A * | 11/1992 | Lederman | ..................... | 277/551 |
| 5,205,565 A * | 4/1993 | Giromella | ..................... | 277/551 |
| 5,332,232 A * | 7/1994 | Kurose | .......................... | 277/551 |
| 5,385,352 A * | 1/1995 | Kurose | .......................... | 277/551 |
| 5,480,235 A * | 1/1996 | Arai | .............................. | 384/484 |
| 5,961,223 A * | 10/1999 | Saigusa | ......................... | 384/484 |
| 6,056,293 A * | 5/2000 | Visconti | ........................ | 277/551 |
| 6,062,734 A * | 5/2000 | Bundgart | ....................... | 384/477 |

(Continued)

FOREIGN PATENT DOCUMENTS

DE   7833640 U1   2/1979
EP   0708263 A1   4/1996

(Continued)

*Primary Examiner* — Kristina Fulton
*Assistant Examiner* — Eugene G Byrd
(74) *Attorney, Agent, or Firm* — Bryan Peckjian; SKF USA Inc. Patent Dept.

(57) ABSTRACT

Sealing unit adapted to be coupled to a rolling-element bearing to seal off the annular space between an inner ring and an outer ring of the bearing, the sealing unit having a stiffening core, and an elastomeric annular element that is rigidly secured to the stiffening core and provided with a sealing lip and a root portion, which is positioned radially on the opposite side of the sealing lip, and which can be snap-fitted into a groove of the outer ring in order to abut the root portion on a front wall of the groove with the core facing toward the outside of bearing.

20 Claims, 2 Drawing Sheets

(56) References Cited

U.S. PATENT DOCUMENTS

| | | | | |
|---|---|---|---|---|
| 6,302,404 | B1* | 10/2001 | Bundgart | 277/573 |
| 6,712,580 | B2* | 3/2004 | Iketani | 415/113 |
| 6,921,083 | B2* | 7/2005 | Yasui et al. | 277/572 |
| 8,231,129 | B2* | 7/2012 | Kobayashi et al. | 277/346 |
| 2004/0264824 | A1* | 12/2004 | Iwata | 384/484 |
| 2006/0018579 | A1* | 1/2006 | Yamamoto | 384/484 |
| 2007/0242913 | A1* | 10/2007 | Kawaguchi | 384/504 |
| 2007/0253655 | A1* | 11/2007 | Egami et al. | 384/484 |

FOREIGN PATENT DOCUMENTS

| | | |
|---|---|---|
| FR | 2926345 A1 | 7/2009 |
| IT | 53245B/85 | 4/1985 |

* cited by examiner

SEALING UNIT FOR ROLLING-ELEMENT BEARINGS

CROSS-REFERENCE TO RELATED APPLICATION

This United States Non-Provisional Utility application claims the benefit of co-pending Italy Provisional Patent Application Ser. No. TO2010A001041, filed on 22 Dec. 2010, which is incorporated herein in its entirety.

FIELD OF THE INVENTION

The present invention relates to a sealing unit for rolling-element bearings.

SUMMARY OF THE INVENTION

The present invention relates to a sealing unit for rolling-element bearings.

In general, as described, for example, in Italian patent application 53245B/85, sealing units for rolling-element bearings comprise:

a stiffening core made of metal, an elastomeric annular element, which is rigidly secured to the stiffening core, and is provided with a sealing lip extending radially outwards from the stiffening core towards an axis of rotation of the unit so as to be in frictional contact with an inner ring of the bearing.

In sealing units of the type described above, the elastomeric annular element has, on the opposite side of the sealing lip, a root portion, which extends radially beyond an outer free edge of the stiffening core and is snap-fitted into a groove made inside an outer ring of the bearing. Since the stiffening core is arranged toward the interior of the bearing with respect to the elastomeric annular element, the snap-fitting of the root portion into the groove determines the consequent pressing of the stiffening core directly against a lateral wall of the groove.

During the use of the bearing, the inclination of the lateral wall of the groove with respect to the axis can determine a similar inclination of the stiffening core with respect to the axis with consequent reduction of the sealing capacity of the unit.

The object of the present invention is to provide a sealing unit for rolling-element bearings which, despite having a structure of simple and cost-effective construction, is capable not only of adapting to different types of bearings, i.e. to the grooves thereof, but also of always maintaining the same sealing capacity, even in difficult conditions of use.

According to the present invention, a sealing unit for rolling-element bearings is provided having the features stated in the appended claims.

BRIEF DESCRIPTION OF THE DRAWINGS

The invention will now be described with reference to the accompanying drawings, which illustrate an embodiment thereof by way of non-limiting example, in which.

DETAILED DESCRIPTION OF THE INVENTION

Figure 1:
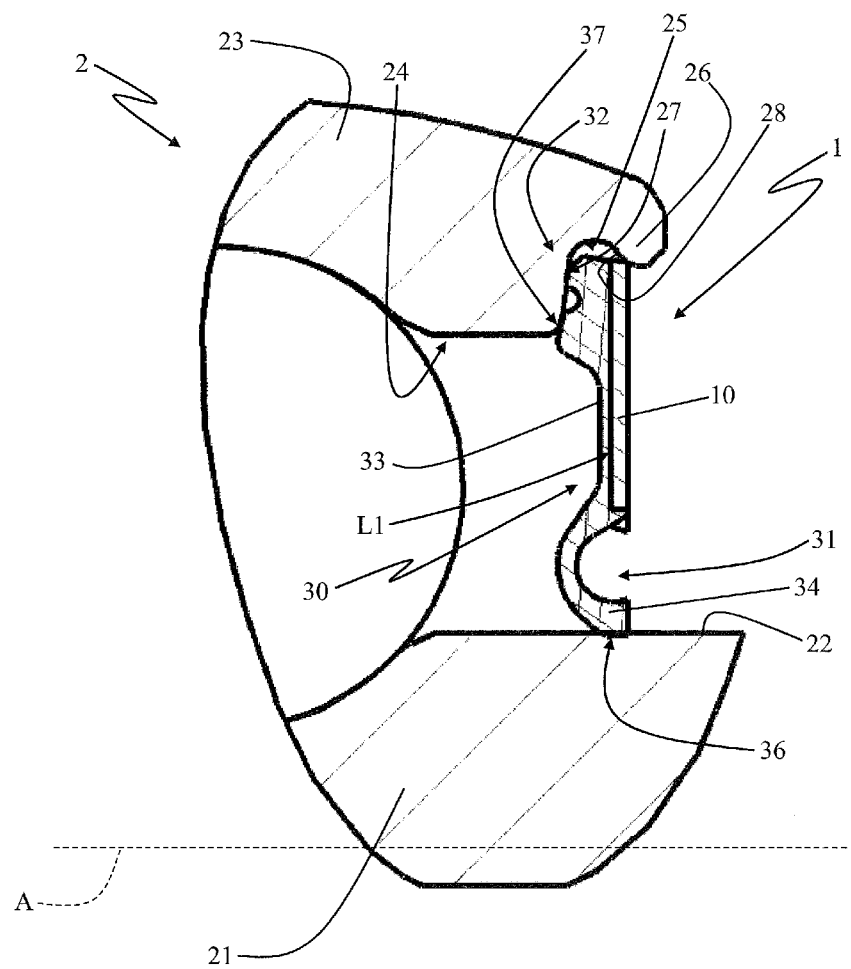
FIG. 1 shows, in elevation, a longitudinally sectioned view of a rolling-element bearing equipped with the sealing unit for rolling-element bearings according to the invention.

With reference to FIG. 1, the numeral 1 indicates, as a whole, a sealing unit for a rolling-element bearing 2.

Rolling-element bearing 2, may be of any known type and comprises an inner ring 21 that is radially outwardly defined by a cylindrical surface 22, and an outer ring 23 that is radially inwardly defined by a respective cylindrical surface 24, which faces surface 22, and is provided with an annular groove 25.

Groove 25 is made starting from an outer axial edge 26 of ring 23 which is hook-shaped and is axially delimited toward the interior of bearing 2 by a front wall 27, which is inclined with respect to an axis A of rotation of unit 1, i.e. of bearing 2. Between front wall 27 and axial edge 26, groove 25 is delimited radially inwardly, i.e. towards axis A, by a curved, concave surface 28.

The unit 1 is adapted to be coupled to the bearing 2 to seal off the annular space between the inner ring 21 and the outer ring 23, and comprises a stiffening core 10, and an elastomeric annular element 30 preferably constructed with an elastomeric material, such as an elastically deformable rubber material, and directly injection-moulded and vulcanized on stiffening core 10 to which, therefore, it is rigidly secured.

Figure 2:
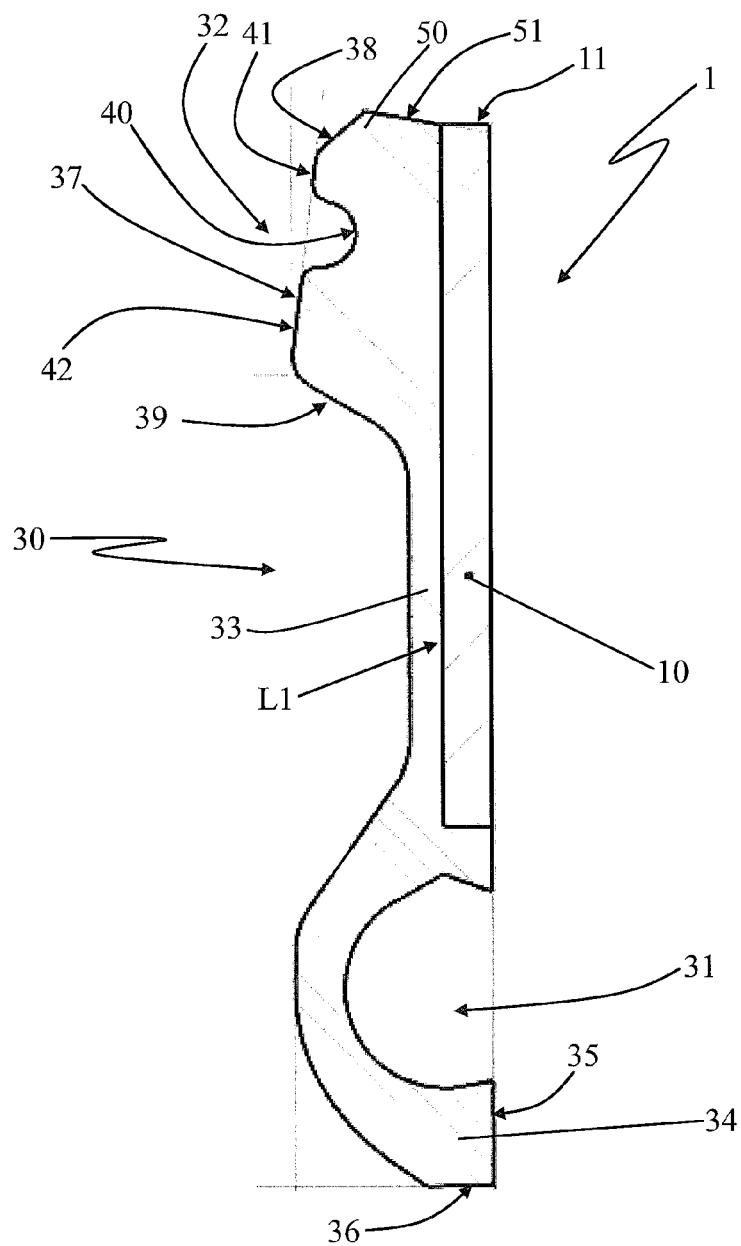
FIG. 2 shows, in enlarged scale, the sealing unit in FIG. 1.

According to what is also shown in FIG. 2, core 10 is preferably made of metal and gives consistency to annular element 30 so as to allow the snap-fitting of unit 1 within groove 25, and annular element 30 comprises:

a sealing lip 31, which extends radially outwards from stiffening core 10 towards axis A so as to be in frictional contact with surface 22 of inner ring 21;

a root portion 32, which is positioned radially on the opposite side to sealing lip 31 with respect to core 10, and which can be snap-fitted into groove 25; and an intermediate covering layer 33, which is arranged between root portion 32 and sealing lip 31 so as to completely cover a single side L1 of stiffening core 10 along with said root portion 32. Indeed, root portion 32, extending only partly along stiffening core 10 in a radial direction, covers only a part of side L1.

Sealing lip 31 is arch-shaped, with the concavity thereof facing axially from opposite side to side L1, and ends with a distal appendix 34 delimited by two surfaces 35 and 36, which are orthogonal to each other and the surface 35 of which is an annular flat surface transversal to axis A, and surface 36 is a cylindrical surface coaxial to axis A. Appendix 34 has a greater thickness than an average thickness of the entire lip 31 so as to contact without solution of continuity surface 22 and to define a coefficient of friction of a value which is in any case limited, taking advantage of the elasticity due to the combination between the material of annular element 30 and between the shape and dimensions of lip 31.

Root portion 32 has a greater axial thickness than an axial thickness of covering layer 33, and is axially delimited by a large front surface 37, which is inclined with respect to axis A and is adapted to abut in direct contact on front wall 27 of groove 25, and from a small front surface 38, smaller than surface 37, which is contiguous to large front surface 37 and, with respect to axis A, has a greater inclination with respect to the inclination of front surface 37.

Root portion 32 is further defined toward axis A by a further surface 39, which is positioned on the opposite side of surface 38 with respect to surface 37 and is connected to both surface 37 and covering layer 33.

Root portion 32 is further provided with an annular groove 40, which is provided on front surface 37 in a radially asymmetrical position with respect to large front surface 37, so as to identify on surface 37 two fractions 41 and 42 of different radial dimensions to each other. In particular, fraction 41, adjacent to surface 38, is smaller with respect to fraction 42 adjacent to surface 39. Groove 40 has, starting from front surface 37, a depth which is smaller than at least one third of an average axial thickness of root portion 32 so as to confer to said portion 32 a defined elasticity and capacity for deformation, without, however, leading to the loss of the profile of portion 32, which is essentially determined by surface 37.

Root portion 32 is lastly provided with an engagement projection 50, which projects radially with respect to an outer free edge 11 of stiffening core 10, and is defined by front surface 38 and by a further conical surface 51, which is inclined with an inclination opposed to surface 38 and connects surface 38 and free edge 11 to each other. However, projection 50 defines a minor part of root portion 32, which is consequently fully backed as a whole by stiffening core 10 in the direction of insertion in use of the unit 1 in groove 25.

The radial extension of stiffening core 10 measured perpendicularly to axis A, namely the outer diameter of free edge 11, stiffening core 10 being preferably shaped as a flat ring, is slightly larger than the inner diameter of axial edge 26.

In use, sealing unit 1 is coupled with bearing 2 so that engagement projection 50 is snap-fitted into groove 25 after overcoming a slight resistance due to the radial interference between projection 50 and edge 26. To overcome the slight radial interference between free edge 11 and axial edge 26 it is possible during insertion merely tilting slightly unit 1. However, according to a preferred embodiment of the invention it is also possible merely rendering core 10 easily elastically deformable by making it in a very elastic material, like harmonic steel.

Unit 1 will be positioned in its operating position when large front surface 37 is abutted directly on front wall 27 of groove 25 and core 10 rests internally to edge 26 although only on a small part close to edge 11. In such operating position, core 10 is arranged facing outside bearing 2, and the whole of side L1 is facing axially toward the interior of bearing 2.

In other words, contrary to what took place in the assembly of the known sealing units described in the introduction, sealing unit 1 of the present invention is arranged in the operating position thereof with stiffening core 10 to the outside of the bearing, and with annular sealing element 30 placed between core 10 and bearing 2. In particular, thanks to this assembly position and to the fact that front surface 37 and wall 27 have the same inclination with respect to axis A, surface 37 will lie completely against wall 27 and this coupling will function as a centring element and a guarantee of the operating position of unit 1.

Furthermore, thanks to the presence of groove 40 in combination with the backing action of core 10, the two fractions 41 and 42 of surface 37 will contribute even more to the maintaining of the assembly position with respect to a possibly completely full surface 37. Groove 40 also makes easier core 10 to be elastically deformed during insertion; likewise, elasticity of core 10 and presence of groove 40 have a synergistic effect which make easier to keep unit 1 in the correct sealing position.

An immediate advantage of the fact that the operating position of sealing unit 1 is maintained stable as described above, i.e. that core 10 will not move from a position in which core 10 wholly lies in a plane practically orthogonal to axis A like as immediately before insertion of unit 1 in groove 25, is the fact that neither will sealing lip 31 be affected by any variation of its position on contact with surface 22 of inner ring 21. In particular, lip 31 will be able to fully exploit the contact between surface 36 and surface 22, which greatly improves the sealing capacity of unit 1.

Since core 10 is no longer covered toward the outside of bearing 2 by elastomeric annular element 30, as described above, when unit 1 is used in environments containing substances which are particularly corrosive to metal, it would be advantageous to either make stiffening core 10 of plastic material, or cover the side opposite of side L1, i.e. the side exposed to the outside of bearing 2, with a film of protective material.

It is understood that the invention is not limited to the embodiment described and illustrated herein, that it is to be considered as an exemplary embodiment of the sealing unit for rolling-element bearings and that it is, on the contrary, susceptible to further modifications relative to the shape and arrangement of parts and construction and assembly details.

What we claim is:

1. A sealing unit for rolling-element bearings comprising:
an inner ring and an outer ring, the outer ring having at least one groove formed on an inside surface with a front wall that is inclined with respect to an axis of rotation of the unit, which sealing unit can be coupled to the rolling-element bearing to seal off an annular space provided between the inner ring and the outer ring and comprises a stiffening core and an elastomeric annular element that is rigidly secured to the stiffening core and that in turn comprises:
a sealing lip extending radially outwards from the stiffening core towards the axis so as to be in frictional contact with the inner ring; and
a root portion, positioned radially on the opposite side to the sealing lip, which can be snap-fitted into the groove;
wherein, when the sealing unit is coupled to the bearing, the root portion is in a position axially internal to the stiffening core and can press directly against the front wall of the groove, and
wherein the root portion is axially delimited by a large front surface that is inclined with respect to the axis, the large front surface being in direct contact in use with the front wall of the groove, and
the root portion further comprising an annular groove made in the large front surface.

2. A sealing unit as recited in claim 1, the root portion further comprising an engagement projection, the engagement projection projecting radially from an outer free edge of the stiffening core, and includes a small front surface contiguous to the large front surface and inclined to a greater degree than said large front surface.

3. A sealing unit as recited in claim 1, wherein the annular groove is formed in an asymmetrical position with respect to said large front surface.

4. A sealing unit as recited in claim 1, wherein the stiffening core is fabricated of metal, and the root portion covers a single side of the stiffening core and extends only partially along the stiffening core in the radial direction.

5. A sealing unit as recited in claim 4, the elastomeric annular element further comprising an intermediate covering layer lying between the root portion and the sealing lip so as to completely cover a single side of the stiffening core along with the root portion.

6. A sealing unit as recited in claim 5, characterized in that the elastomeric annular element is directly injection-moulded and vulcanized on the stiffening core, to which it is rigidly secured.

7. A sealing unit as recited in claim 1, the sealing lip further comprising a free end that is radially defined by a cylindrical surface capable of coming into frictional contact with the inner ring.

8. A sealing unit as recited in claim 1, wherein:
a radial extension of the stiffening core measured perpendicularly to the axis is slightly larger than the inner diameter of an axial edge of the groove opposite to the front wall; and, in combination, and the root portion has an annular groove facing the side opposite to the stiffening core and toward the outer ring of the bearing in use; the root portion being fully backed as a whole by the stiffening core in the direction of insertion in use of the unit in the groove.

9. A sealing unit as recited in claim 1, wherein the stiffening core wholly lies in a plane substantially orthogonal to the axis.

10. A rolling-element bearing comprising:
the sealing unit according to claim 1,
wherein between the front wall and an axial edge opposite of the at least one groove, the outer ring is delimited radially inwardly towards the axis, by a curved, concave surface.

11. A sealing unit for a rolling-element bearing, the rolling-element bearing having an axis of rotation and comprising an inner ring and an outer ring, the outer ring having at least one groove in a radially inner surface, the at least one groove having an axially outwardly facing wall inclined relative to the axis of rotation,
the sealing unit being configured to be snap-fitted to the groove of the rolling-element bearing to seal an annular space between the inner ring and the outer ring,
the sealing unit comprising a stiffening core having a radially inner edge and a radially outer edge and an elastomeric annular element rigidly secured to the stiffening core,
the elastomeric annular element comprising a sealing lip extending radially inward from the stiffening core and a root portion radially outward of the sealing lip, the root portion having a center portion on the stiffening core radially inward of the radially outer edge of the stiffening core, the center portion having a back surface in contact with the stiffening core and a front surface opposite the back surface, the front surface including an annular channel.

12. A sealing unit as recited in claim 11, wherein a bottom of the annular channel is axially spaced from the back surface.

13. A sealing unit as recited in claim 11, wherein the annular channel is disposed radially inward of the radially outer edge and disposed radially outward of the radial inner edge.

14. A sealing unit as recited in claim 11, wherein the front surface has a radially inner edge and a radially outer edge and wherein the annular channel is radially closer to a first one of the front surface radially inner edge and the front surface radially outer edge than to a second one of the front surface radially inner edge and the front surface radially outer edge.

15. A sealing unit as recited in claim 11, wherein the center portion does not extend radially beyond the stiffening core.

16. A sealing unit as recited in claim 15, wherein the annular channel separates the front surface into a first annular portion having a first width and a second annular portion having a second width different than the first width.

17. A rolling-element bearing including a sealing unit as recited in claim 11.

18. A rolling-element bearing having a sealing unit,
the rolling-element bearing having an axis of rotation and comprising an inner ring and an outer ring, the outer ring having at least one groove in a radially inner surface, the at least one groove having an axially outwardly facing wall inclined relative to the axis of rotation;
the sealing unit being mounted in the at least one groove of the rolling-element bearing to seal an annular space between the inner ring and the outer ring,
the sealing unit comprising a stiffening core having a radially inner edge and a radially outer edge and an elastomeric annular element rigidly secured to the stiffening core,
the elastomeric annular element comprising a sealing lip extending radially inward from the stiffening core and contacting the inner ring and a root portion radially outward of the sealing lip and contacting the axially outwardly facing wall,
wherein the root portion includes an annular channel facing the axially outwardly facing wall and defining with the axially outwardly facing wall an annular volume.

19. A rolling-element bearing as recited in claim 18, wherein the root portion includes a center portion radially inward of the radial outer edge of the stiffening core, the center portion having a back surface in contact with the stiffening core and a front surface opposite the back surface and in contact with the axially outwardly facing wall, the annular channel being formed in the front surface.

20. A rolling-element bearing as recited in claim 18, wherein the annular channel separates the front surface into a first annular portion having a first width and a second annular portion having a second width different than the first width and wherein the first annular portion and the second annular portion are located radially inward of the radially outer edge of the stiffening core.

* * * * *